(12) United States Patent
Emile et al.

(10) Patent No.: US 12,140,569 B2
(45) Date of Patent: Nov. 12, 2024

(54) METHOD AND SYSTEM FOR AN ULTRASONIC DETECTION OF INTERNAL DEFECTS OF A COMPONENT, IN PARTICULAR FOR AN AIRCRAFT

(71) Applicant: Airbus Operations SAS, Toulouse (FR)

(72) Inventors: Philippe Emile, Toulouse (FR); Marc Grimal, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/824,097

(22) Filed: May 25, 2022

(65) Prior Publication Data
US 2022/0381746 A1 Dec. 1, 2022

(30) Foreign Application Priority Data
May 27, 2021 (FR) ....................... 2105549

(51) Int. Cl.
*G01N 29/34* (2006.01)
*B64F 5/60* (2017.01)

(52) U.S. Cl.
CPC ............. *G01N 29/346* (2013.01); *B64F 5/60* (2017.01); *G01N 2291/2694* (2013.01)

(58) Field of Classification Search
CPC ......... G01N 29/346; G01N 2291/2694; G01N 2291/106; G01N 29/11; G01N 29/262; G01N 29/4445; G01N 29/043; B64F 5/60; Y02P 10/25
See application file for complete search history.

(56) References Cited

U.S. PATENT DOCUMENTS

2005/0252296 A1* 11/2005 Hock .................. G01N 29/225
                                              73/623
2022/0107290 A1* 4/2022 Jin ....................... G01N 29/043
2022/0281107 A1* 9/2022 Grimard ............... G01N 29/04

FOREIGN PATENT DOCUMENTS

| DE | 102012025535 A1 | 6/2014 |
|---|---|---|
| FR | 3085095 A1 | 2/2020 |
| WO | 2022016726 A1 | 1/2022 |

OTHER PUBLICATIONS

French Search Report; priority document.

* cited by examiner

*Primary Examiner* — Xin Y Zhong
(74) *Attorney, Agent, or Firm* — Greer, Burns & Crain, Ltd.

(57) ABSTRACT

The system includes an ultrasonic measuring device including ultrasonic transmitters and ultrasonic receivers, the ultrasonic measuring device carrying out ultrasonic measurements on a zone of interest of the component divided according to a gridding including cells, and carrying out the measurements cell after cell with the generation, by all the ultrasonic transmitters, of an ultrasonic signal that is sent into the component, and the measurement, by all the ultrasonic receivers, of the amplitude of the ultrasonic signal reflected by the cell in question of the component, a unit for computing, for all of the cells of the gridding, the sum of the amplitudes of all the measurements carried out for that cell, and a processing part for deducing the presence or absence of one or more defects. The system detects all the defects existing in the zone of interest of the component, whatever their orientation may be.

8 Claims, 3 Drawing Sheets

METHOD AND SYSTEM FOR AN ULTRASONIC DETECTION OF INTERNAL DEFECTS OF A COMPONENT, IN PARTICULAR FOR AN AIRCRAFT

CROSS-REFERENCES TO RELATED APPLICATIONS

This application claims the benefit of the French patent application No. 2105549 filed on May 27, 2021, the entire disclosures of which are incorporated herein by way of reference.

FIELD OF THE INVENTION

The present invention relates to a method and a system for an ultrasonic detection of internal defects of a component, in particular for an aircraft.

BACKGROUND OF THE INVENTION

Although not exclusively, this method is more particularly intended for providing assistance in the inspection of components obtained by a manufacturing method of the DED (standing for "Directed Energy Deposition") type, and, in particular, during the manufacture of components intended for aircraft, notably transport aircraft.

In a known way, such a DED (or Directed Energy Deposition) manufacturing method is an additive manufacturing (or 3D printing) method in which a material is deposited on a support and focused heat energy is used to melt the material as it is deposited. The material, a powder or a wire, is deposited by a nozzle, and is immediately melted by a laser or electron beam, or by arc deposition technologies (using plasma, for example). This method is most often used with metallic powders or wires (alloys based on aluminum, titanium or nickel, . . . ). DED technologies have several advantages in comparison with more conventional additive manufacturing methods, and notably a high manufacturing speed and the possible manufacture of large components.

It is known that such a DED manufacturing method generates or can generate defects such as porosities or lack of fusion in the manufactured components. In the context of the present invention, internal "defects" of a component are understood to mean an at least partial absence of matter in the material forming the component.

Porosities can generally be detected by usual methods using radiography and ultrasonic measurements.

The difficulty during the inspection of such components manufactured by a DED method concerns the detection of linear defects, generated due to a lack of fusion, which can exhibit various shapes and orientations.

The usual inspections carried out by radiography and ultrasonic measurements do not make it possible to detect such defects, or do so only very partially.

There is thus a need to have a method making it possible to detect any type of defect in a component, for example roundish defects such as porosities or inclusions of denser material ("solid inclusion" being the English expression) and also linear defects such as lack of fusion, and to do so whatever the orientations of these defects in the component may be.

SUMMARY OF THE INVENTION

A purpose of the present invention is to meet this need. In order to do this, it relates to a method for an ultrasonic detection of internal defects of a component, in particular for an aircraft.

According to the invention, the method comprises at least the following steps:

a measuring step, implemented by an ultrasonic measuring device, consisting of carrying out measurements on a so-called zone of interest of the component, the zone of interest being divided according to a gridding comprising elementary cells, the ultrasonic measuring device comprising a plurality of ultrasonic transmitters spaced from each other and a plurality of ultrasonic receivers spaced from each other, the measuring step consisting of successively carrying out, cell after cell, for each of the cells of the gridding, a plurality of successions of operations, the successions of operations being implemented successively, ultrasonic transmitter after ultrasonic transmitter, from each of the ultrasonic transmitters of the ultrasonic measuring device, each of the successions of operations comprising the following operations: the generation by the ultrasonic transmitter in question of an ultrasonic signal which is sent into the component and the measurement, by each of the ultrasonic receivers of the ultrasonic measuring device, of the amplitude of the corresponding ultrasonic signal, reflected by the cell in question of the component;

a computing step, implemented by a computing unit, comprising computing, for each of the cells of the gridding, the sum of the amplitudes of all of the measurements, carried out in the measuring step for that cell, in order to obtain a so-called overall amplitude for the cell; and a processing step, implemented by a processing unit, comprising at least deducing from the overall amplitudes computed for all of the cells of the gridding, as the case may be, the presence of one or more defects.

In the context of the present invention, the zone of interest corresponds to a spatial zone of the component in which an ultrasonic inspection is carried out.

Thus, due to the gridding of the zone of interest and to the carrying out of measurements in all of the cells of that gridding, data is obtained for the whole of the area of the zone of interest in question, that is to say, of the zone of the component that one wishes to inspect. Moreover, due to a spaced arrangement of the transmitters and receivers, and to the processing of data obtained from all of the transmitters and from all of the receivers arranged in different positions on the ultrasonic measuring device, there is obtained, for each cell, measurements carried out at different and varied transmission and reception angles, which makes it possible to obtain an ultrasonic image of each cell according to different views. It is therefore possible to detect defects in the component which have different orientations and shapes.

The ultrasonic detection method therefore makes it possible to detect all of the defects existing in the zone of interest of the component, and to do so no matter what the spatial orientation of this defect or these defects may be. The method is particularly suitable for detecting linear defects generated during a DED manufacturing method. However, this method can also be used for detecting defects in other types of components, for example welds.

In a preferred embodiment, the processing step also comprises determining, if appropriate, the contour of a defect in the plane of the zone of interest as a function of the overall amplitudes computed for all of the cells of the grid.

Moreover, advantageously, the processing step also comprises computing, if appropriate, the length of a defect from the length between the two cells most distant from each other among all of the cells for which the defect has been detected.

Moreover, advantageously, the gridding comprises identical square-shaped cells, the sides of which have a length greater than one tenth of a so-called acceptance criterion.

Moreover, advantageously, the measuring step consists of generating an ultrasonic signal having a frequency of between 7.5 MHz and 13 MHz.

The present invention also relates to a system for an ultrasonic detection of internal defects of a component, in particular for an aircraft.

According to the invention, the system comprises at least:
- an ultrasonic measuring device comprising a plurality of ultrasonic transmitters spaced from each other and a plurality of ultrasonic receivers spaced from each other, the ultrasonic measuring device being configured to carry out measurements on a so-called zone of interest of the component, the zone of interest being divided according to a gridding comprising elementary cells, the ultrasonic measuring device being configured for successively carrying out, cell after cell for each of the cells of the gridding, a plurality of successions of operations, the successions of operations being implemented successively, ultrasonic transmitter after ultrasonic transmitter, from each of the ultrasonic transmitters of the ultrasonic measuring device, each of the successions of operations comprising the following operations: the generation by the ultrasonic transmitter in question of an ultrasonic signal which is sent into the component and the measurement, by each of the ultrasonic receivers of the ultrasonic measuring device, of the amplitude of the ultrasonic signal reflected by the cell in question of the component;
- a computing unit configured for computing, for each of the cells of the gridding, the sum of the amplitudes of all of the measurements carried out for that cell in order to obtain a so-called overall amplitude for the cell; and
- a processing unit configured at least for deducing, from the computed overall amplitudes for all of the cells of the gridding, as the case may be, the presence of one or more defects.

In a preferred embodiment, the ultrasonic measuring device comprises a plurality of ultrasonic units, each of the ultrasonic units comprising an ultrasonic transmitter and an ultrasonic receiver, and the ultrasonic units are arranged side by side along a linear bar.

Moreover, advantageously, the ultrasonic measuring device comprises at least 64 ultrasonic transmitters and at least 64 ultrasonic receivers.

Moreover, advantageously, the ultrasonic measuring device comprises a delay line.

Moreover, advantageously, the system comprises a unit for the presentation of the results of the processing implemented by the processing unit.

The system, such as described above, can be used in various applications, notably for carrying out component conformity checks, in particular for components for an aircraft, during their manufacture, or much later during a maintenance or inspection operation.

BRIEF DESCRIPTION OF THE DRAWINGS

The appended figures will give a good understanding of how the invention can be embodied. In these figures, identical references denote similar units.

DETAILED DESCRIPTION OF THE PREFERRED EMBODIMENTS

Figure 1:
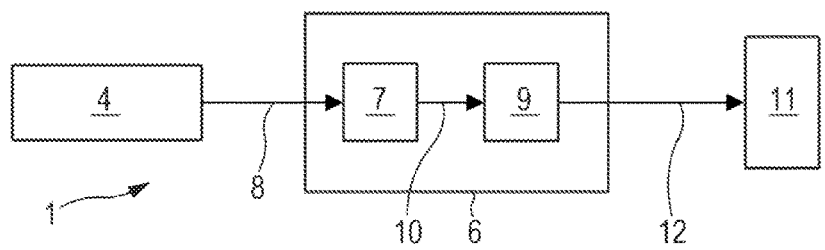
FIG. 1 is the bock diagram of a particular embodiment of an ultrasonic detection system.

The system 1, shown diagrammatically in FIG. 1 and making it possible to illustrate the invention, is a device for analyzing the conformity of a material 3 integrated in a component 2 (FIG. 3), in particular for an aircraft.

This system 1 is intended for detecting defects in the material 3 of the component 2.

In the context of the present invention, internal "defects" of a component is understood to mean an at least partial absence of matter in the material forming the component. It can notably be a matter of roundish defects such as, for example, porosities or of linear defects such as, for example, lack of fusion.

The system 1 is particularly suitable for analyzing a component 2 whose material 3 has been deposited using a usual manufacturing method of the DED (standing for "Directed Energy Deposition") type.

In order to do this, the system 1 comprises an ultrasonic measuring device 4, as shown in FIG. 1.

Figure 2:
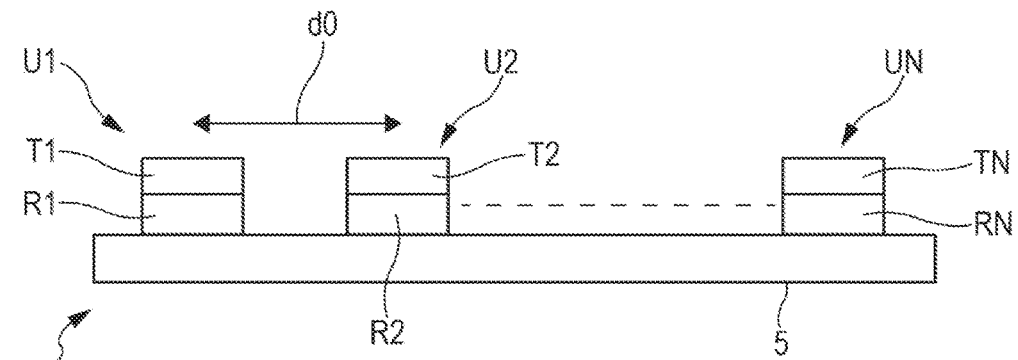
FIG. 2 is the block diagram of an ultrasonic measuring device of the system shown in FIG. 1.

This ultrasonic measuring device 4 comprises, as shown in FIG. 2, a plurality of N ultrasonic units U1, U2, . . . , UN, N being an integer specified below. The N ultrasonic units U1, U2, . . . , UN are mounted on a linear bar 5. They are arranged side by side along the linear bar 5, being spaced from each other. Preferably, for the N ultrasonic units U1, U2, . . . , UN, two adjacent ultrasonic units are each time spaced, from each other, by the same distance (or pitch) d0.

Each of the N ultrasonic units U1 to UN comprises an ultrasonic transmitter T1 to TN able to generate an ultrasonic signal in a usual way and an ultrasonic receiver R1 to RN able to receive (and detect), and ultrasonic signal in a usual way.

In a preferred embodiment, the integer N is equal to 64 or 128, and preferably equal to 64. In this case, the ultrasonic measuring device 4 therefore comprises 64 ultrasonic transmitters and 64 ultrasonic receivers.

Other numbers N are of course possible in the context of the present invention. Likewise, it is possible to envisage having a number N1 of ultrasonic transmitters and a number N2 of ultrasonic receivers, N2 being an integer different from the integer N1.

By way of illustration (not limiting), the ultrasonic measuring device 4 can comprise 64 ultrasonic units which are spaced from each other by a pitch d0 of between 0.3 and 0.6 mm along the linear bar 5.

Each of the ultrasonic transmitters T1 to TN is therefore able to transmit an ultrasonic signal. In the context of the present invention, the longitudinal waves of the ultrasonic signal are used for the transmission and for the reception.

Figure 3:
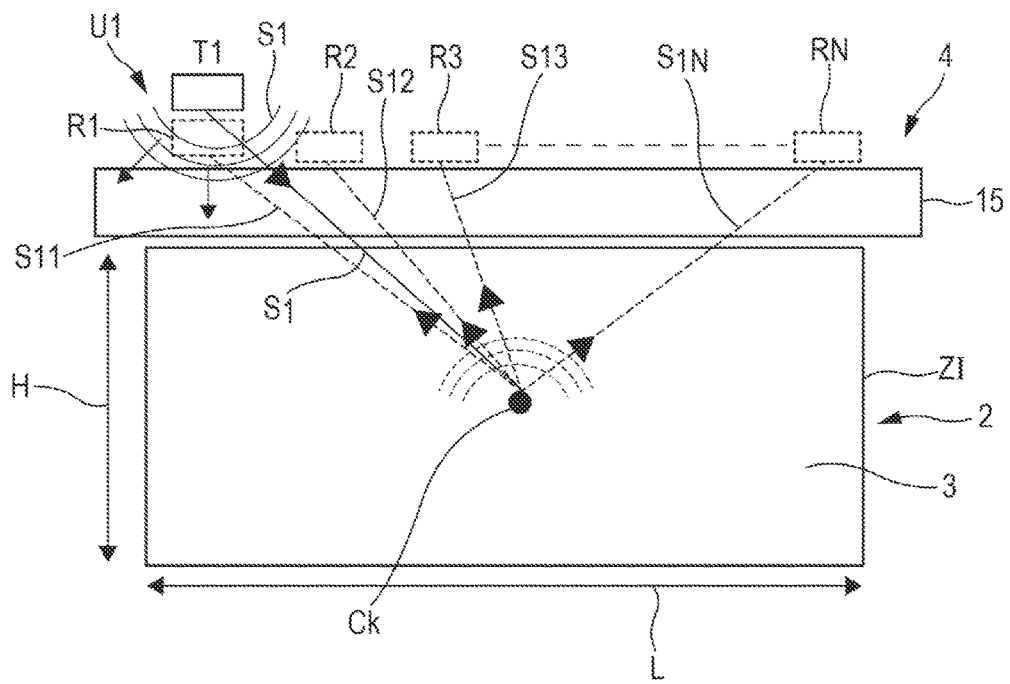
FIG. 3 is a partial cross-sectional view of a component intended to be analyzed using the ultrasonic detection device.

As described in more detail below, each ultrasonic transmitter T1 to TN of the ultrasonic measuring device 4 is configured for generating an ultrasonic signal Si and for transmitting the ultrasonic signal Si (thus generated) into the component 2, as shown in FIG. 3 for a signal Si generated by the ultrasonic transmitter T1. Preferably, the ultrasonic signal Si has a frequency of between 7.5 MHz and 10 MHz.

Moreover, each ultrasonic receiver R1 to RN of the ultrasonic measuring device 4 is configured for measuring the amplitude of a received ultrasonic signal Sij, namely, as described below, the amplitude of the part of the ultrasonic signal Si (transmitted by an ultrasonic transmitter T1 to TN), which is returned (after reflection) by the component 2, as described below.

It is known that the propagation of an ultrasonic signal in a component (such as the component 2) is characterized, as the case may be, by characteristic (reflection) peaks, which correspond to acoustic impedance breaks in the component, at the interfaces of different materials. In the case where the material 3 is uniform in the component 2, acoustic impedance breaks are generated, as the case may be, at the interface between, on the one hand, the material 3 and, on the other hand, an absence of material, that is to say, a defect such as those described above. Consequently, an ultrasonic signal transmitted into the material (by an ultrasonic transmitter) is reflected by a defect, if it encounters such a defect during its propagation in the material. The ultrasonic signal thus reflected (and detected by an ultrasonic receiver) has a high amplitude, characteristic of the presence of such a defect.

The ultrasonic measuring device 4 is configured for carrying out measurements on a so-called zone of interest ZI of the component 2 shown diagrammatically in FIG. 3. The zone of interest ZI corresponds to a cross section of the component 2. By way of illustration (not limiting), the zone of interest ZI has a width L of the order of 25 mm and a depth H of the order of 50 mm.

Figure 4:
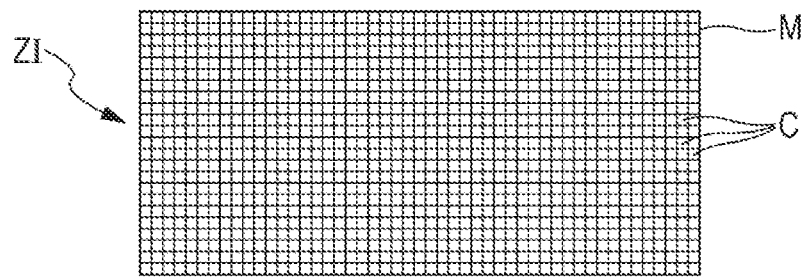
FIG. 4 is a diagrammatic illustration of an example of gridding a zone of interest.

In the context of the present invention, the zone of interest ZI is divided according to a gridding M comprising elementary cells C, as shown in FIG. 4. The ultrasonic measuring device 4 is configured for successively carrying out, cell after cell, for each of the cells C of the gridding M, a plurality of successions of operations.

The successions of operations are implemented successively, ultrasonic transmitter after ultrasonic transmitter, from each of the ultrasonic transmitters T1 to TN of the ultrasonic measuring device 4. Each of the successions of operations comprises, for a given ultrasonic transmitter, the following operations:

the generation by the ultrasonic transmitter of an ultrasonic signal which is sent into the component 2; and
the measurement, by each of the ultrasonic receivers R1 to RN of the ultrasonic measuring device 4, of the amplitude of the ultrasonic signal reflected by the cell in question of the component 2.

Figure 5:
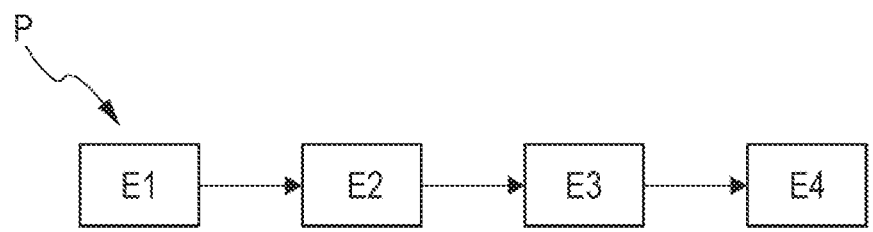
FIG. 5 is a block diagram showing the main steps of an ultrasonic detection method.

These operations are described in more detail below, with reference to an ultrasonic detection method P (FIG. 5).

The system 1 also comprises, as shown in FIG. 1, a processing unit 6 carrying out the processing of the measurements carried out by the ultrasonic measuring device 4. This processing unit comprises:

a computing unit 7 configured for computing, for each of the cells C of the gridding M, the sum of the amplitudes of all of the measurements carried out for the cell in question and received via a link 8 from the ultrasonic measuring device 4 in order to obtain a so-called overall amplitude for the cell; and
a processing part 9 configured at least for deducing from the overall amplitudes computed for all of the cells C of the gridding M, and received via a link 10 from the computing unit 7, as the case may be, the presence of one or more defects. The processing part 9 can implement other processing described below.

Moreover, in a preferred embodiment, the ultrasonic measuring device 4 comprises a delay line 15 as shown in FIG. 3. This delay line 15 allows an ultrasonic signal, transmitted by an ultrasonic transmitter of the ultrasonic measuring device 4, to arrive with a non-zero angle with respect to the normal, in the component 2 at the upstream end (in the direction of propagation of the ultrasonic signal). This delay line 15 makes it possible for the ultrasonic measuring device 4 to be able to carry out an inspection of the component 2 also at this upstream end.

Moreover, the system 1 comprises a unit 11 for presenting the results of the processing implemented by the processing part 9 of the processing unit 6. This unit 11 is intended to provide an operator or a system with the result (received by a link 12) of the processing carried out by the processing part 9. In order to do this, the unit 11 can, notably, comprise:

a usual means for displaying the result (for example the location of defects);
a usual means for printing the result; and
a usual means for transmitting the result, for example via a wired link or a non-wired link.

The system 1, such as described above, is able to implement a method P of analysis of the conformity of the material 3 of a component 2, for example such as the one shown in FIG. 3. The method P shown diagrammatically in FIG. 5 is described below, notably with reference to FIGS. 1, 3, 4, 6 and 7.

The method P firstly comprises a measuring step E1 (FIG. 5), implemented by the ultrasonic measuring device 4 (FIG. 1).

This measuring step E1 comprises carrying out measurements on the zone of interest ZI of the component 2 (FIG. 3), in order to analyze it.

The zone of interest ZI is therefore divided according to a gridding M comprising elementary cells C, as shown in FIG. 4. The size of the cells can depend on the size of the zone of interest ZI and on the resolution of the ultrasonic units U1 to UN. Preferably, the cells C of the gridding M are square; they can also be rectangular.

In a preferred embodiment, the gridding M comprises identical square-shaped cells C, the sides of which have a length greater than one tenth of a so-called acceptance criterion. Acceptance criterion is understood to mean the maximum size or length which is accepted for a defect of the component, for example 1 mm. This acceptance criterion notably depends on the component in question and on the envisaged application.

The measuring step E1 consists of successively carrying out, cell C after cell C, for each of the cells C of the gridding M, a plurality of N successions of operations SO.

For any one of the cells C, the N successions of operations SO are implemented successively, ultrasonic transmitter after ultrasonic transmitter, from each of the N ultrasonic transmitters T1 to TN of the ultrasonic measuring device 4.

Each of the N successions of operations SO comprises the following operations:

a transmission operation corresponding to the generation by an ultrasonic transmitter T1 (i ranging from 1 to N) of an ultrasonic signal Si which is sent into the component 2, as shown by way of example in FIG. 3 for an ultrasonic signal S1 sent into the component 2 by the ultrasonic transmitter T1; and N reception operations corresponding to the measuring, by each of the N ultrasonic receivers T1 to TN of the ultrasonic measuring device 4, of the amplitude of an ultrasonic signal Sij corresponding to the part of the ultrasonic signal Si (transmitted by an ultrasonic transmitter T1 to TN) which is returned (after reflection) by the cell in question of the component. By way of illustration, FIG. 3 shows signals S11, S12, S13 and S1N which correspond to the reflection by a cell Ck of the ultrasonic signal S1 (transmitted by the ultrasonic transmitter T1). These signals S11, S12, S13 and S1N are measured by the ultrasonic receivers R1, R2, R3 and RN respectively.

Consequently, there is obtained, for a given cell C (such as the cell Ck in FIG. 3 for example), N measurements for each of the N ultrasonic transmitters (such as the N measurements relating to the ultrasonic transmitter T1). N×N measurements are therefore obtained for each cell C. Each of these N×N measurements comprises the amplitude of the sound signal measured by the corresponding ultrasonic receiver.

Figure 6:
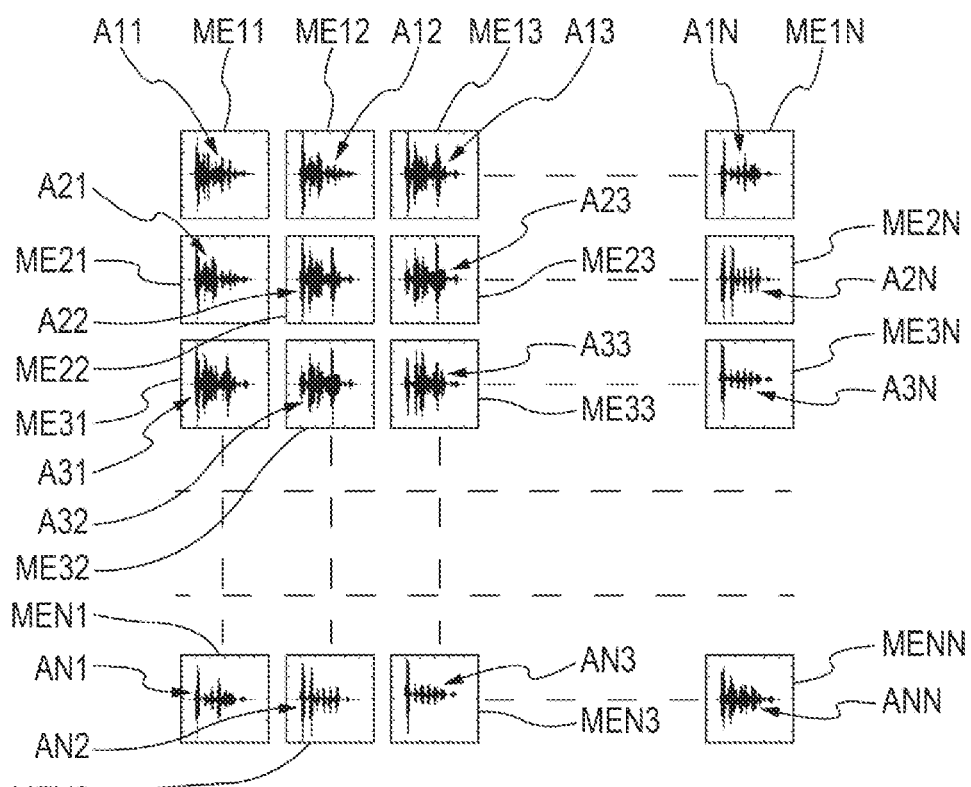
FIG. 6 is a diagram showing examples of measurements of the variation of the amplitude of the reflected ultrasonic signal, for a given cell of the gridding of the zone of interest.

By way of illustration, FIG. 6 shows, for a given cell C of the gridding M, some of the amplitudes Aij of the N×N measurements MEij carried out for that cell, namely those for which i and j have the values 1, 2, 3 and N. Each of the measurements MEij therefore comprises a measurement of the "A-Scan" type.

The method P also comprises a computing step E2, implemented by the computing unit 7. This computing step E2 comprises computing, for each of the cells C of the gridding M, the sum of the amplitudes Aij of all of the measurements MEij carried out in the measuring step E1 for that cell.

Because of this summation, the computing step E2 makes it possible to obtain a so-called overall amplitude for each of the C cells of the gridding M.

The method P also comprises a processing step E3, implemented by the processing part 9, after the computing step E2.

This processing step E3 comprises deducing from the overall amplitudes computed for all of the cells of the gridding, as the case may be, the presence of one or more defects. A defect is considered as being detected in a cell when the overall amplitude (that is to say, the sum of the measured amplitudes) of that cell exceeds a predetermined threshold.

Figure 7:
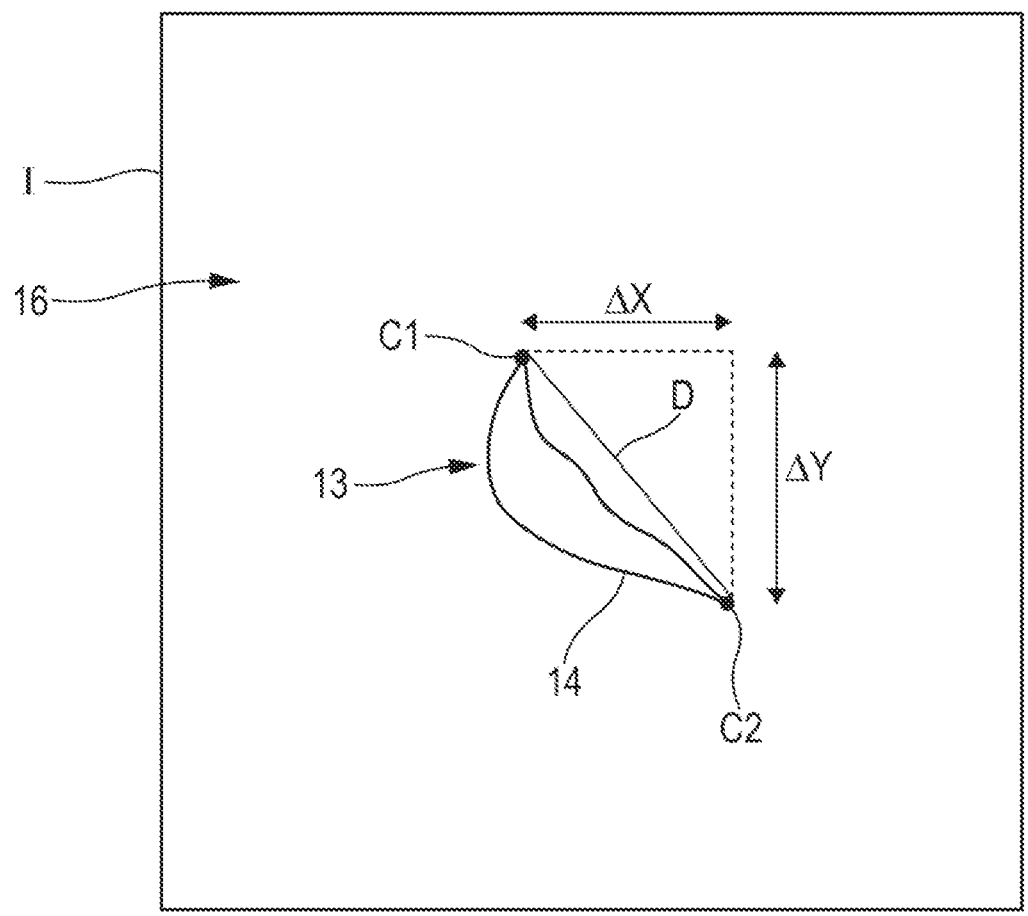
FIG. 7 represents an image illustrating the result of the processing carried out on a zone of interest, this image showing the zone of interest with a defect.

In a preferred embodiment, the processing step E3 consists of determining, in the case of detection of a defect, as a function of the overall amplitudes of the cells detecting a defect, the contour 14 of the defect 13 in the plane of the zone of interest, as shown in FIG. 7.

FIG. 7 shows an image I illustrating the result of the processing carried out on a zone of interest ZI. This image I (of the analyzed zone of interest) comprises a single defect 13.

Moreover, in the processing step E3, the processing part 9 can also compute the length D of an identified defect. In order to do this, as shown in FIG. 7, the processing part 9 computes the length D of the defect 13 from the length between the two cells C1 and C2 most distant from each other, among all of the cells on which the defect 13 was detected. For this purpose, the processing part 9 can determine a distance ΔX (along the rows of the grid) as well as a distance ΔY (along the columns of the grid) between the cells C1 and C2, and then compute the distance L from these two distances ΔX and ΔY.

The method P comprises, moreover, a step E4, implemented by the unit 11, comprising presenting and/or transmitting to an operator or to a system, some or all of the results (identification of the defect 13, presentation of the contour 14 of defect 13, value of the length D of the defect 13, . . . ) obtained in the processing step E3. The presentation can be carried out by various usual means in display or printed form.

In a particular embodiment, it is possible to produce a map of the analyzed structure revealing the defects by the intermediary of one or more particular colors. This map can resemble the image I in FIG. 7, upon which there has been shown with different colors the background (having no defects) of the analyzed zone of interest and the defect 13. This particular embodiment allows an operator to identify and locate the possible defects quickly and in a visual manner.

The system 1 implementing the method P such as described above, thus allows an efficient detection of all of defects existing in a zone of interest of a component, and to do so no matter what the spatial orientation of this defect or these defects may be.

In fact, due to the gridding M of the zone of interest ZI and to the carrying out of measurements in all of the cells C of that gridding M, the system 1 obtains data for the whole area of the zone of interest ZI in question, that is to say, of the zone of the component 2 that one wishes to inspect. Moreover, due to a spaced arrangement of the ultrasonic units U1 to UN along the linear bar 5 and to the processing of the data obtained from all of the ultrasonic transmitters and from all of the ultrasonic receivers therefore arranged at different positions on the linear bar 5 of the ultrasonic measuring device 4, the system 1 obtains, for each cell C, measurements carried out at different and varied angles of transmission and of reception. This makes it possible to obtain an ultrasonic image of each cell C taken at different views. The system 1 is thus able to detect defects (in the component 2), which exhibit various orientations, and more generally any possible orientation.

The (ultrasonic detection) system 1 therefore makes it possible to detect all of the defects existing in the zone of interest ZI of the component 2, and to do so no matter what the spatial orientation and the shape of that defect or those defects may be. The system 1 is particularly suitable for detecting linear defects generated during the use of a DED manufacturing method. However, this method can also be used for detecting defects in other types of components, for example welds.

The system 1, such as described above, can be used in various applications.

In particular, in a first possible application, the system 1 is used for carrying out conformity checks during the manufacture of a component, for example of an aircraft, and notably during the manufacture of a component by a manufacturing method of the DED type. In this application, the system 1 makes it possible to carry out an accurate, fast and reliable check of the deposited material of the component is such a way as to be able to detect the presence of defects.

In a second possible application, the measurements can be carried out during an assembly operation, or during a subsequent check with the component already fitted, for example during a maintenance operation. In such an application, the system 1 can notably be used for carrying out measurements in particular places of the component, for example in one or more places where it is considered that a defect may exist.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for an ultrasonic detection of internal defects of a component for an aircraft, the method comprising at least the following steps:
    measuring, implemented by an ultrasonic measuring device, comprising carrying out measurements on a zone of interest of the component, the zone of interest being divided according to a gridding comprising elementary cells, the gridding comprising identical square-shaped cells whose sides have a length less than or equal to one tenth of an acceptance criterion, the acceptance criterion corresponding to a maximum size or length which is accepted for a defect of the component, the ultrasonic measuring device comprising a plurality of ultrasonic transmitters spaced from each other and a plurality of ultrasonic receivers spaced from each other,
    the measuring step comprising successively carrying out, cell after cell, for each of the cells of the gridding, a plurality of successions of operations,
    the successions of operations being implemented successively, ultrasonic transmitter after ultrasonic transmitter, from each of the ultrasonic transmitters of the ultrasonic measuring device,
    each of the successions of operations comprising the following operations:
        generating, by the ultrasonic transmitter in question, an ultrasonic signal which is sent into the component, and
        measuring, by each of the ultrasonic receivers of the ultrasonic measuring device, an amplitude of the corresponding ultrasonic signal, reflected by the cell in question of the component;
    computing, implemented by a computing unit, comprising computing, for each of the cells of the gridding, a sum of the amplitudes of all of the measurements carried out in the measuring step, for that cell, to obtain an overall amplitude for the cell;
    processing, implemented by a processing part, comprising at least deducing from the overall amplitudes computed for all of the cells of the gridding a presence of one or more defects, and
    wherein the processing step also comprises computing a length of a defect from a length between two cells most distant from each other among all of the cells for which the defect has been detected.

2. The method as claimed in claim 1, wherein the processing step also comprises determining a contour of a defect in a plane of the zone of interest as a function of overall amplitudes computed for all of the cells of the gridding.

3. The method as claimed in claim 1, wherein the measuring step comprises generating an ultrasonic signal having a frequency of between 7.5 MHz and 13 MHz.

4. A system for an ultrasonic detection of internal defects of a component, said system comprising:
    an ultrasonic measuring device comprising a plurality of ultrasonic transmitters spaced from each other and a plurality of ultrasonic receivers spaced from each other, the ultrasonic measuring device being configured to carry out measurements on a zone of interest of the component, said zone of interest being divided according to a gridding comprising elementary cells, the gridding comprising identical square-shaped cells, whose sides have a length less than or equal to one tenth of an acceptance criterion, the acceptance criterion corresponding to a maximum size or length which is accepted for a defect of the component, the ultrasonic measuring device being configured to successively carry out, cell after cell for each of the cells of the gridding, a plurality of successions of operations, said successions of operations being implemented successively, ultrasonic transmitter after ultrasonic transmitter, from each of the ultrasonic transmitters of the ultrasonic measuring device, each of the successions of operations comprising the following operations: a generation by the ultrasonic transmitter in question of an ultrasonic signal which is sent into the component and the measurement, by each of the ultrasonic receivers of the ultrasonic measuring device, of an amplitude of the ultrasonic signal reflected by the cell in question of the component;
    a computing unit configured to compute, for each of the cells of the gridding, a sum of the amplitudes of all of the measurements carried out for that cell to obtain an overall amplitude for said cell;
    a processing part configured at least to deduce, from the computed overall amplitudes computed for all of the cells of the gridding, a presence of one or more defects, and
    wherein a length of the one or more defects is calculated from a length between two cells most distant from each other among all of the cells for which the one or more defects has been detected.

5. The system as claimed in claim 4,
    wherein the ultrasonic measuring device comprises a plurality of ultrasonic units, each of said ultrasonic units comprising an ultrasonic transmitter and an ultrasonic receiver, and
    wherein said ultrasonic units are arranged side by side along a linear bar.

6. The system as claimed in claim 4, wherein the ultrasonic measuring device comprises at least 64 ultrasonic transmitters and at least 64 ultrasonic receivers.

7. The system as claimed in claim 4, wherein the ultrasonic measuring device comprises a delay line.

8. The system a claimed in claim 4, further comprising a unit for a presentation of results of the processing implemented by the processing part.

* * * * *